United States Patent
Yamaguchi

(10) Patent No.: US 9,561,594 B2
(45) Date of Patent: Feb. 7, 2017

(54) ROBOT, ROBOT SYSTEM, AND ROBOT CONTROL APPARATUS

(71) Applicant: Seiko Epson Corporation, Tokyo (JP)

(72) Inventor: Yukihiro Yamaguchi, Matsumoto (JP)

(73) Assignee: Seiko Epson Corporation (JP)

( * ) Notice: Subject to any disclaimer, the term of this patent is extended or adjusted under 35 U.S.C. 154(b) by 45 days.

(21) Appl. No.: 14/532,412

(22) Filed: Nov. 4, 2014

(65) Prior Publication Data

US 2015/0127160 A1    May 7, 2015

(30) Foreign Application Priority Data

Nov. 5, 2013  (JP) ................................ 2013-229064

(51) Int. Cl.
- *G05B 15/00* (2006.01)
- *G05B 19/00* (2006.01)
- *B25J 9/16* (2006.01)

(52) U.S. Cl.
CPC .... *B25J 9/1697* (2013.01); *G05B 2219/37208* (2013.01); *G05B 2219/37555* (2013.01); *G05B 2219/39107* (2013.01); *G05B 2219/39109* (2013.01); *G05B 2219/40072* (2013.01); *G05B 2219/40087* (2013.01); *G05B 2219/40609* (2013.01); *G05B 2219/40615* (2013.01); *G05B 2219/45203* (2013.01); *Y10S 901/09* (2013.01); *Y10S 901/41* (2013.01); *Y10S 901/47* (2013.01)

(58) Field of Classification Search
CPC .................... B25J 9/1697; G05B 2219/37208; G05B 2219/37555; G05B 2219/39107; G05B 2219/40072; G05B 2219/40087; G05B 2219/452; G05B 2219/40609; Y10S 901/41; Y10S 901/47

USPC .......................................................... 700/259
See application file for complete search history.

(56) References Cited

U.S. PATENT DOCUMENTS

| 6,008,636 | A | * | 12/1999 | Miller | G01R 31/01 324/757.01 |
|---|---|---|---|---|---|
| 2007/0239315 | A1 | * | 10/2007 | Sato | B25J 9/1612 700/245 |
| 2008/0249659 | A1 | * | 10/2008 | Ueyama | B25J 9/0018 700/245 |
| 2011/0122228 | A1 | * | 5/2011 | Fujieda | G01B 11/03 348/46 |
| 2011/0141251 | A1 | * | 6/2011 | Marks | G06T 1/0014 348/61 |
| 2012/0152877 | A1 | * | 6/2012 | Tadayon | B25J 5/02 212/224 |

(Continued)

FOREIGN PATENT DOCUMENTS

| JP | 06-288740 | 10/1994 |
|---|---|---|
| JP | 2000-084876 A | 3/2000 |
| JP | 2003-229700 A | 8/2003 |

OTHER PUBLICATIONS

Extended European Search Report for Application No. EP 14 19 1446 dated Oct. 1, 2015 (7 pages).

*Primary Examiner* — Harry Oh
(74) *Attorney, Agent, or Firm* — Harness, Dickey & Pierce, P.L.C.

(57) ABSTRACT

A robot includes, a holding unit configured to hold an object, an image pickup unit, and a predetermined first portion of the robot. The image pickup unit picks up images of the holding unit and the object using the first portion as a background.

16 Claims, 8 Drawing Sheets

(56) References Cited

U.S. PATENT DOCUMENTS

| | | | | |
|---|---|---|---|---|
| 2013/0182903 A1* | 7/2013 | Nammoto | .......... | G06K 9/00664 |
| | | | | 382/103 |
| 2013/0266205 A1* | 10/2013 | Valpola | ................. | B25J 9/1669 |
| | | | | 382/153 |
| 2013/0343640 A1* | 12/2013 | Buehler | ................ | B25J 9/0087 |
| | | | | 382/155 |
| 2014/0012416 A1* | 1/2014 | Negishi | ................ | B25J 9/1607 |
| | | | | 700/251 |
| 2014/0100696 A1* | 4/2014 | Kim | ..................... | B25J 9/1697 |
| | | | | 700/259 |

\* cited by examiner

ROBOT, ROBOT SYSTEM, AND ROBOT CONTROL APPARATUS

BACKGROUND

1. Technical Field

The present invention relates to a robot, a robot system, and a robot control apparatus.

2. Related Art

In recent years, in manufacturing sites and the like, scalar robots, multi-axis robots, and the like are used for assembly, inspection, and the like of products. When a robot carries an object in performing assembly or inspection of a product, the robot attracts the object or grips the object with an arm.

In automatic assembly and other work processes, such an industrial robot is requested to efficiently grasp, in a predetermined posture, a target object that takes unspecified various postures. In the industrial robot, a driver is attached to an end effector of the robot. The industrial robot automatically performs screwing in place of a human. In performing the screwing, the industrial robot recognizes the position and the shape of a screw through image processing.

For example, an image processing apparatus is disclosed that, in an environment in which an object is machined and cutting chips and the like are scattered, picks up an image of the object with a television camera or the like and recognizes the position and the shape of the object through image processing (see, for example, JP-A-6-288740 (Patent Literature 1)).

However, in Patent Literature 1, a container section is provided in a portion serving as a background of the object in the image processing, nontransparent liquid having a color distinguishable from a color of the object in the image processing is stored in the container section, and a liquid surface of the nontransparent liquid is used as a background of the object. Therefore, stain and rust in a work environment occur. The image processing apparatus is used in a wet environment. An image pickup direction is only one direction in the gravity direction. Therefore, the image processing apparatus lacks versatility.

SUMMARY

An advantage of some aspects of the invention is to solve at least a part of the problems described above, and the invention can be implemented as the following forms and application examples.

APPLICATION EXAMPLE 1

This application example is directed to a robot including: a holding unit configured to hold an object; an image pickup unit; and a predetermined first portion of the robot. The image pickup unit picks up images of the holding unit and the object using the first portion as a background.

According to this application example, the predetermined first portion is used as a background for the image pickup of the holding unit. Therefore, it is possible to perform image processing without using a complicated algorithm. Consequently, the image processing is accurately and quickly performed. As a result, in image inspection, it is possible to realize versatile and stable inspection by using a housing of a robot as a background.

APPLICATION EXAMPLE 2

This application example is directed to the robot according to the application example described above, wherein the first portion has a predetermined color.

According to this application example, since the first portion has the predetermined color, it is possible to perform the image processing without using a more complicated algorithm.

APPLICATION EXAMPLE 3

This application example is directed to the robot according to the application example described above, wherein the first portion has a uniform contrast.

According to this application example, since the contrast is uniform, it is possible to perform the image processing without using a more complicated algorithm.

APPLICATION EXAMPLE 4

This application example is directed to the robot according to the application example described above, wherein the first portion is a body section of the robot.

According to this application example, it is possible to easily realize stable inspection.

APPLICATION EXAMPLE 5

This application example is directed to the robot according to the application example described above, wherein the image pickup unit picks up images of the holding unit and the object in an image pickup direction for the holding unit different from an image pickup direction of the image pickup, which is performed using the first portion as the background, and using a second portion of the robot as a background.

According to this application example, in picking up an image of the object held by the holding unit, the image pickup unit picks up an image using, as a background, the second portion in which the image pickup direction for the holding unit is different from the image pickup direction of the image pickup performed using the first portion as the background. Therefore, a geometrical relation of the first portion and the second portion is bipolarized. It is possible to clearly perform the image processing.

APPLICATION EXAMPLE 6

This application example is directed to the robot according to the application example described above, wherein, in the image pickup direction, the image pickup is performed in two directions in a relation of 90 degrees with respect to the object.

According to this application example, since the image pickup is performed directly horizontally as well, it is possible to accurately recognize a shifting direction of the object.

APPLICATION EXAMPLE 7

This application example is directed to the robot according to the application example described above, wherein the second portion has a predetermined color.

According to this application example, since the second portion has the predetermined color, it is possible to perform the image processing without using a more complicated algorithm.

APPLICATION EXAMPLE 8

This application example is directed to the robot according to the application example described above, wherein the second portion has a uniform contrast.

According to this application example, since the contrast is uniform, it is possible to perform the image processing without using a more complicated algorithm.

APPLICATION EXAMPLE 9

This application example is directed to the robot according to the application example described above, wherein the second portion is an arm of the robot.

According to this application example, it is possible to easily realize stable inspection.

APPLICATION EXAMPLE 10

This application example is directed to the robot according to the application example described above, wherein the object is a driver to which a screw is attracted.

According to this application example, it is possible to realize stable inspection of the screw attracted to the driver.

APPLICATION EXAMPLE 11

This application example is directed to the robot according to the application example described above, wherein the holding unit turns.

According to this application example, it is possible to easily pick up an image using, as a background, the second portion in which the image pickup direction for the holding unit is different from the image pickup direction of the image pickup performed using the first portion as the background.

APPLICATION EXAMPLE 12

This application example is directed to a robot system including: the robot according to any one of the application examples described above; and a robot control apparatus. The robot control apparatus includes a control unit that picks up, with the image pickup unit, images of the holding unit and the object using the first portion as a background.

According to this application example, the predetermined first portion is used as a background for the image pickup of the holding unit. Therefore, it is possible to perform image processing without using a complicated algorithm. Consequently, the image processing is accurately and quickly performed. As a result, in image inspection, it is possible to realize versatile and stable inspection by using a housing of a robot as a background.

APPLICATION EXAMPLE 13

This application example is directed to a robot control apparatus that controls a robot including a holding unit, an image pickup unit, and a predetermined first portion of the robot. The robot control apparatus includes a control unit that picks up, with the image pickup unit, images of the holding unit and the object using the first portion as a background.

According to this application example, the predetermined first portion is used as a background for the image pickup of the holding unit. Therefore, it is possible to perform image processing without using a complicated algorithm. Consequently, the image processing is accurately and quickly performed. As a result, in image inspection, it is possible to realize versatile and stable inspection by using a housing of a robot as a background.

BRIEF DESCRIPTION OF THE DRAWINGS

The invention will be described with reference to the accompanying drawings, wherein like numbers reference like elements.

FIGS. 7A and 7B are diagrams for explaining an example in which a screw is fit in an engaging section of the electric driver, wherein FIG. 7A is a diagram showing a state in which the screw is correctly fit in the engaging section and FIG. 7B is a diagram showing a state in which the screw is not correctly fit in the engaging section.

FIGS. 8A to 8C are diagrams for explaining image inspection at two visual points performed by the robot, wherein FIG. 8A is a diagram for explaining the image inspection at one visual point, FIG. 8B is a diagram for explaining the image inspection at the other visual point, and FIG. 8C is a diagram showing the two visual points.

DESCRIPTION OF EXEMPLARY EMBODIMENTS

An embodiment of the invention is explained below with reference to the drawings.

Figure 1:
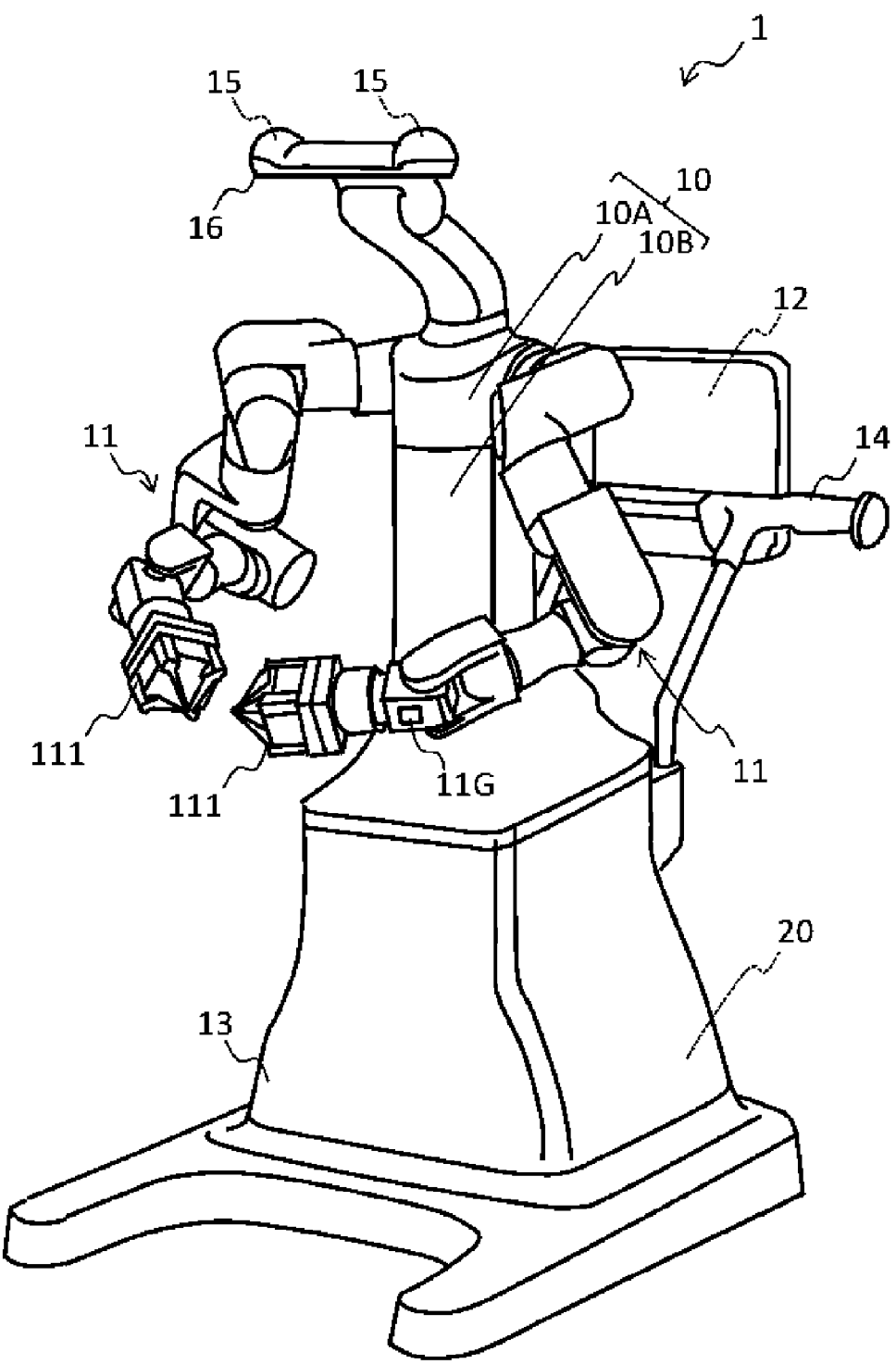
FIG. 1 is a front perspective view showing an example of a robot according to an embodiment.
Figure 2:
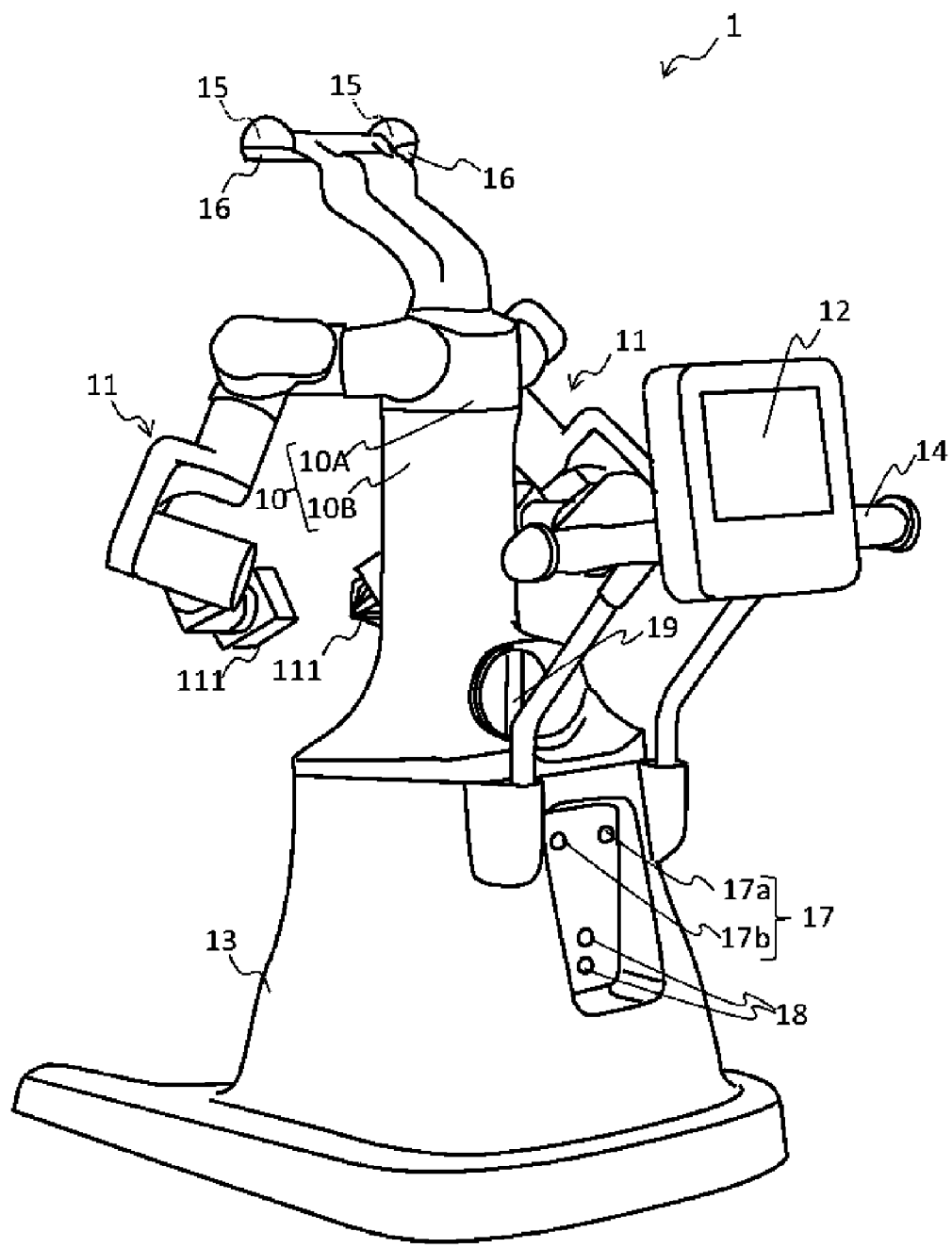
FIG. 2 is a rear perspective view showing the example of the robot.

FIG. 1 is a front perspective view showing an example of a robot 1 according to the embodiment of the invention. FIG. 2 is a rear perspective view showing an example of the robot 1.

The robot 1 includes a body section (a trunk section) 10, arms 11, a touch panel monitor 12, a leg section 13, a conveying handle 14, cameras 15, a signal lamp 16, a power switch 17, an external interface (I/F) unit 18, and a lifting and lowering handle 19. The robot 1 is a human type double-arm robot and operates according to control by a control unit 20 (see FIG. 4). The robot 1 can be used in a manufacturing process for assembling a precision instrument such as a printer. Note that this manufacturing work is usually performed on a workbench (not shown in the figure).

The body section 10 is provided on a frame of the leg section 13. Note that the leg section 13 is a base of the robot 1. The body section 10 is a trunk of the robot 1. The body section 10 can also be referred to as robot main body. The robot main body may be the body section 10 and the leg section 13 rather than the body section 10 alone.

The body section 10 includes a shoulder area 10A on the upper side and a body section main body 10B on the lower side. In the shoulder area 10A, the arms 11 (also referred to as "manipulators") projecting to the front surface side are respectively provided on both side surfaces of the shoulder area 10A.

Hands 111 (also referred to as "end effectors") that hold (a broad concept including grasp and grip) a work target object (also referred to as "workpiece") and a tool. In the arm 11, a hand eye camera (an image pickup unit) 11G that picks up an image of a workpiece or the like placed on the workbench is provided. Details of the arms 11 and the hands 111 are explained below.

The hand eye camera 11G is, for example, a CCD (Charge Coupled Device) camera. The hand eye camera 11G picks up an image of a screw (an object) A20 attracted to (held by) an electric driver (a holding unit) A30 (see FIG. 5) and outputs picked-up image data having an analog value to the control unit 20. Note that the hand eye camera 11G may pick up images of the electric driver A30 and the screw A20 using, as a background, the arm 11 of the robot 1 in which an image pickup direction for the hand 111 is different from an image pickup direction of image pickup performed using the body section 10 of the robot 1 as a background. Consequently, in picking up an image of the electric driver A30 held by the hand 111, the hand eye camera 11G picks up an image using, as a background, the arm 11 in which the image pickup direction for the hand 111 is different from the image pickup direction of the image pickup performed using the body section 10 as the background. Therefore, a geometrical relation of the body section 10 and the arm 11 is bipolarized. It is possible to clearly perform the image processing. Note that the background only has to enable the image processing to be performed without using a complicated algorithm. For example, the hand eye camera 11G may pick up images of the electric driver A30 and the screw A20 using the body section 10 or the arm 11 of the robot 1 as a part of the background.

In a portion equivalent to the head of the robot 1 obliquely projecting in the upward direction from the shoulder area 10A of the body section 10 to the front surface side, two cameras 15 and the signal lamp 16 are provided.

The camera 15 includes, for example, a CCD (Charge Coupled Device), a CMOS (Complementary Metal Oxide Semiconductor), or the like. The camera 15 can pick up images of the workbench and the like. The signal lamp 16 includes, for example, LEDs that respectively emit red light, yellow light, and blue light and causes the LED selected as appropriate according to the present state of the robot 1 to emit light.

The control unit 20 or the like that controls the robot 1 is provided on the inside of the leg section 13. A rotating shaft extending in the up down direction with respect to the robot 1 is provided on the insides of the leg section 13 and the body section main body 10B. The shoulder area 10A of the body section 10 is provided in the rotating shaft. The shoulder area 10A can be rotationally moved about the rotating shaft. That is, members above the body section main body 10B can be integrally directed to any direction about the rotating shaft.

On the rear surface of the leg section 13, the power switch 17 and the external I/F unit 18, which is an external connection terminal that connects the control unit 20 and an external PC or the like, are provided. The power switch 17 includes a power ON switch 17a for turning on a power supply of the robot 1 and a power OFF switch 17b for interrupting the power supply of the robot 1.

In the bottom section of the leg section 13, a plurality of casters not shown in the figure are set a space apart from one another in the horizontal direction. Consequently, an operator can move and convey the robot 1 by, for example, pushing the conveying handle 14.

The lifting and lowering handle 19 is provided on the rear surface of the body section 10. The lifting and lowering handle 19 moves the shoulder area 10A present in an upper part of the body section 10 in the up down direction with respect to the body section main body 10B. Consequently, it is possible to cope with workbenches having various heights.

On the rear surface side of the body section 10, the touch panel monitor 12 visually recognizable from the rear surface side of the robot 1 is arranged. The monitor is, for example, a liquid crystal display. The monitor can display, for example, the present state of the robot 1. The touch panel is, for example, an electrostatic or piezoelectric touch panel. The touch panel is used as a user interface unit for performing, for example, setting of an operation for the robot 1.

Figure 3:
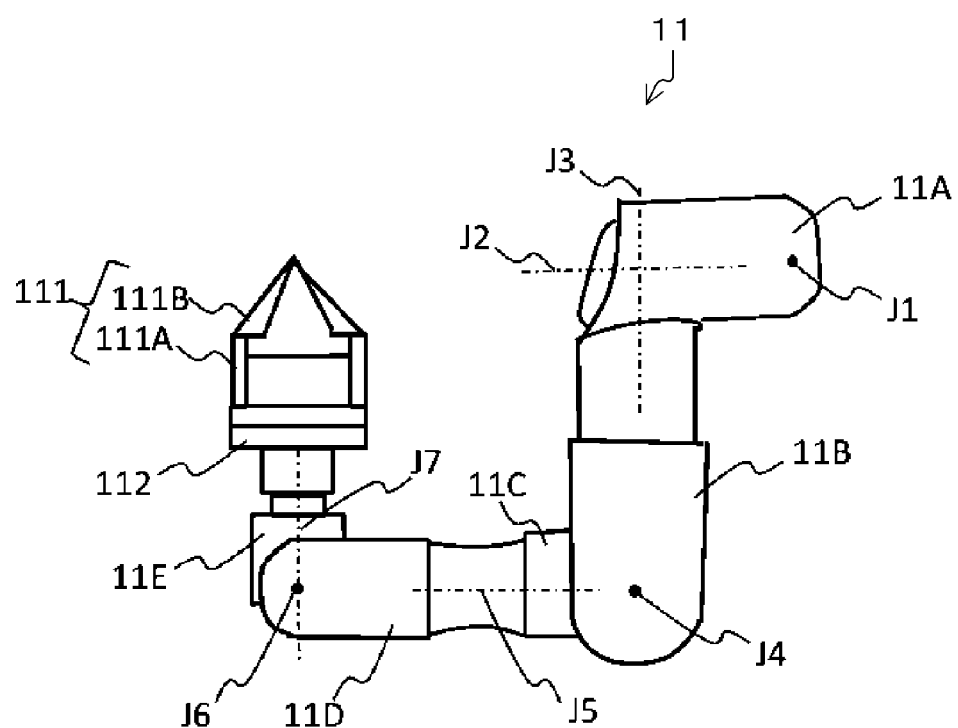
FIG. 3 is a diagram showing details of an arm and a hand.

FIG. 3 is a diagram showing details of the arm 11 and the hand 111.

The arm 11 is configured by coupling arm members (also referred to as "manipulator members") 11A, 11B, 11C, 11D, and 11E with joints (not shown in the figure) in order from the body section 10 side. In the joints, actuators (not shown in the figure) for actuating the joints are provided.

The arm 11 is a seven-axis arm including seven turning axes. Seven turning axes J1, J2, J3, J4, J5, J6, and J7 are respectively rotation axes of the actuators provided in the joints. The arm members 11A, 11B, 11C, 11D, and 11E and the hand 111 can independently turn about the turning axes J1, J2, J3, J4, J5, J6, and J7.

Figure 4:
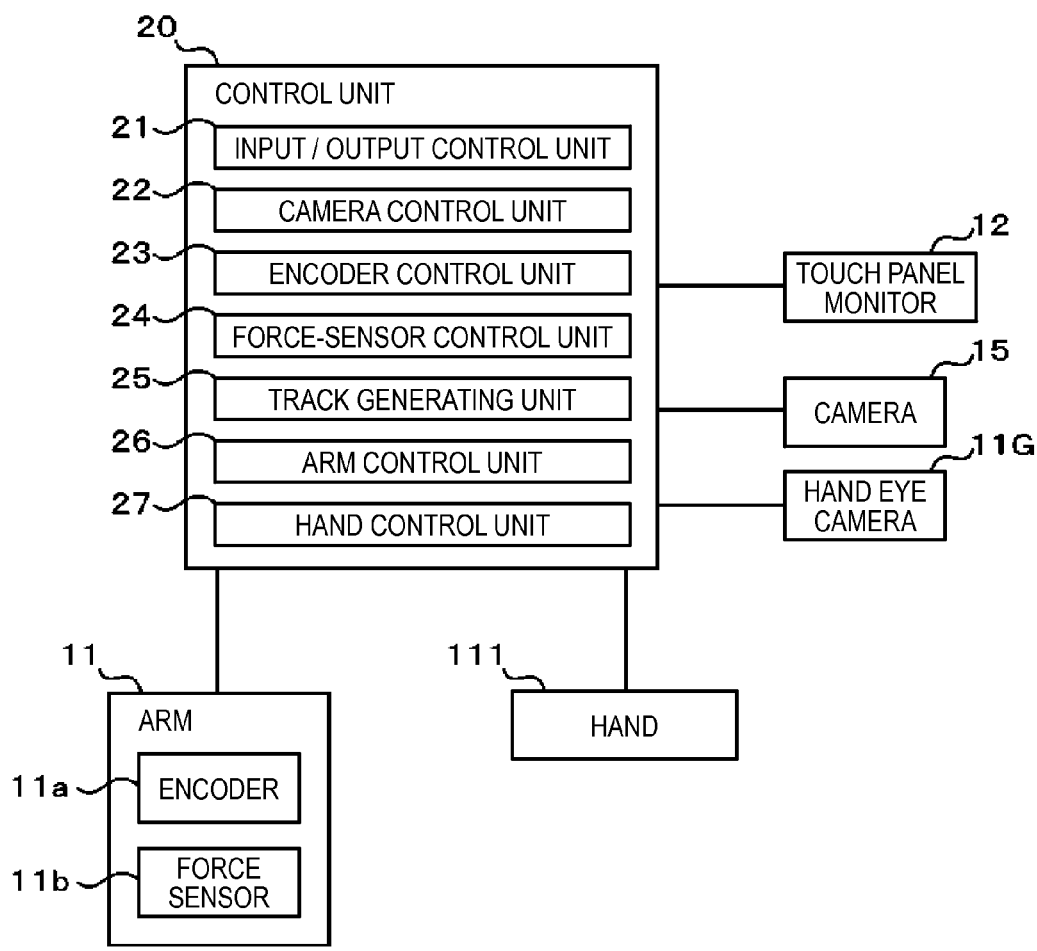
FIG. 4 is a diagram showing an example of a functional configuration of the robot.

The actuator includes, for example, a servo motor and an encoder 11a (see FIG. 4). An encoder value output by the encoder is used for, for example, feedback control for the robot 1 by the control unit 20. An electromagnetic brake for fixing the rotation axis is provided in the actuator.

By associating the rotation axes, it is possible to freely move a position of interest (also referred to as "end point") set, for example, at the distal end section of the arm 11 within a predetermined movable range or direct the position of interest to a free direction. Note that the position of the end point is not limited to the distal end section of the arm 11 and may be set, for example, at the distal end section of an end effector.

At the distal end of the arm member 11E (equivalent to a wrist portion of the arm 11), a force sensor (not shown in the figure) is provided. The force sensor is a sensor that detects a force or a moment received as reaction to a force output by the robot 1. As the force sensor, for example, a six-axis force sensor that can simultaneously detect force components in translational three-axis directions and six components of moment components about rotational three axes can be used. Note that the force sensor is not limited to six axes and may have, for example, three axes. A force and a moment applied to the hand or the like can be detected by the force sensor.

Note that a method of detecting a force and a moment applied to the hand or the like is not limited to a method of detecting the force and the moment applied to the hand using the force sensor. For example, an external force applied to the hand can be estimated from axis torque values of the arm 11. Therefore, the arm 11 only has to include means for directly or indirectly acquiring the force and the moment applied to the hand.

At the distal end of the arm member 11E, the hand 111 is provided via an attaching and detaching member 112 for detachably providing the hand 111.

The hand 111 includes a main body section 111A and a plurality of (e.g., any number from two to four) fingers 111B arranged on the distal end side of the main body section 111A. The external shape of the main body section 111A is substantially a rectangular parallelepiped shape. A driving mechanism (not shown in the figure) for driving the fingers 111B is provided on the inside of the main body section 111A. The fingers 111B are brought close to one another by the driving mechanism, whereby a target object such as a component can be held among the fingers 111B. The fingers 111B are separated from one another from this holding state by the driving mechanism, whereby the target object can be released.

Note that the arm 11 can be considered a type of a manipulator. The manipulator is a mechanism for moving the position of the end point. The manipulator is not limited to the arm and can take various forms. For example, the manipulator may take any form as long as the manipulator is configured by one or more joints and links and the entire manipulator is moved by moving the joints. The number of manipulators provided in the robot 1 is not limited to two and may be one or three or more.

Note that the hand 111 can be considered a type of an end effector. The end effector is a member for gripping, pressing, lifting, hanging, and attracting a target object and machining a workpiece. The end effector can take various forms such as a hand, a hook, and a sucker. A plurality of end effectors may be provided for one arm.

By adopting the configuration explained above, for example, the robot 1 can grip the workpiece with the hand 111 and bring the hand 111 into contact with the workpiece under the control by the control unit 20. For example, the robot 1 can apply forces in various directions to the workpiece and press the workpiece with the hand 111 and apply various moments to the workpiece.

In the configuration of the robot 1 explained above, the main components are explained to explain features of this embodiment. The configuration is not limited to the configuration example shown in the figures. Components included in a general robot are not excluded. For example, the number of joints (also referred to as "number of axes") and the number of links may be increased or reduced. The shapes, the sizes, the arrangement, the structures, and the like of the various members such as the joints, the links, and the hands may be changed as appropriate.

For example, the control unit 20 may be provided on the outside of the robot 1 as a robot control apparatus that realizes the function of the control unit 20. In this case, the robot control apparatus is connected to the robot 1 via a communication I/F or the like. A system including the robot control apparatus and the robot can also be referred to as robot system.

FIG. 4 is a diagram showing an example of a functional configuration of the robot 1.

The control unit 20 includes an input/output control unit 21, a camera control unit 22, an encoder control unit 23, a force-sensor control unit 24, a track generating unit 25, an arm control unit 26, and a hand control unit 27. The arm 11 includes an encoder 11a and a force sensor 11b.

The control unit 20 controls the arm 11 and the hand 111 of the robot 1 as explained below. The control unit 20 discriminates on the basis of image data output by the hand eye camera 11G whether the screw A20 attracted to the electric driver A30 is correctly fit as explained below. According to a discrimination result, when the screw A20 attracted to the electric driver A30 is correctly fit, the control unit 20 controls the electric driver A30 to tighten the screw A20 into a screw hole of a target object to be screwed.

The input/output control unit 21 controls an output to the touch panel monitor 12 and an input from the touch panel monitor 12. For example, the input/output control unit 21 causes the touch panel monitor 12 to display a state of the robot 1, an image picked up by the camera 15, and the like. For example, the input/output control unit 21 receives operation by a user on the touch panel monitor 12.

The camera control unit 22 controls the camera 15 and the hand eye camera 11G to perform image pickup and acquires a picked-up image. The camera control unit 22 performs image processing for, for example, extracting a workpiece from the acquired image.

The encoder control unit 23 acquires information such as an angle of the encoder 11a from the encoder 11a and outputs the information to the arm control unit 26 and the like.

The force-sensor control unit 24 acquires information concerning values measured by the force sensor 11b such as the direction of a force, the magnitude of the force, the direction of a moment, and the magnitude of the moment.

The track generating unit 25 generates a track of an end point. For example, the track generating unit 25 generates the track of the end point on the basis of the picked-up image acquired by the camera control unit 22. Specifically, the track generating unit 25 recognizes the position of the workpiece from the image acquired by the camera control unit 22 and replaces the position of the workpiece with a robot coordinate. The track generating unit 25 generates a track for moving the present robot coordinate of the end point to a robot coordinate of the workpiece. Naturally, a track set by the user may be used. Note that, as processing for generating a track, a general technique can be adopted. Therefore, detailed explanation of the processing is omitted.

The arm control unit 26 controls the arm 11 on the basis of the track generated by the track generating unit 25 and the information concerning the encoder 11a acquired by the encoder control unit 23 (position control). For example, the arm control unit 26 outputs a moving command indicating a rotation angle of the joint to the actuator and drives the actuator.

The arm control unit 26 controls the arm 11 on the basis of the information concerning the force sensor 11b acquired by the force-sensor control unit 24 (force control such as impedance control). For example, the arm control unit 26 adjusts the position and the posture of the end point such that the magnitude of a force in a specific direction detected by the force sensor 11b reaches target magnitude. For example, the arm control unit 26 adjusts the position and the posture of the end point such that the magnitude of a specific moment detected by the force sensor 11b reaches target magnitude. Consequently, the operation of the robot 1 for pressing the hand 111 against the workpiece can be realized. Note that, as processing such as the position control and the force control, a general technique can be adopted. Therefore, detailed explanation of the processing is omitted. The arm control unit 26 may move the position of the end point using visual servo or the like instead of the position control.

As explained below with reference to a specific example, in this embodiment, for example, when the robot 1 performs screwing work for a certain component, the robot 1 places the component on a jig (or another component) in which a positioning section is provided. The robot 1 presses the component against the jig (or the other component) in a plane direction perpendicular to a direction in which a force is applied during the screwing work (a direction in which a screw is inserted) and presses the component against the jig in the direction in which a force is applied during the screwing work. Consequently, the component is more surely prevented from moving.

The hand control unit 27 controls the hand 111. For example, when the end point reaches a target position where the workpiece can be gripped, the hand control unit 27 generates a command value for bringing the fingers close to one another and outputs the command value to the driving mechanism of the hand 111.

The control unit 20 can be realized by, for example, a computer including an arithmetic unit such as a CPU (Central Processing Unit), a main storage device such as a RAM (Random Access Memory), an auxiliary storage device such as a HDD (Hard Disk Drive), a communication interface (I/F) for connecting the computer to a communication network by wire or radio, an input I/F for connecting the computer to an input device such as a touch panel, an output I/F for connecting the computer to a display device, and a read/write device for reading information from and writing information in a portable storage medium. The control unit 20 may be realized by an ASIC (Application Specific Integrated Circuit) exclusive for a robot. The control unit 20 may be realized by, for example, a controller board including an arithmetic unit, a storage device, a processing circuit, and a driving circuit.

For example, the functions of the control unit 20 are realized by the arithmetic unit executing a predetermined computer program loaded to the main storage device from the auxiliary storage device or the like. The predetermined computer program may be installed from the storage medium read by the read/write device or may be installed from the network via the communication I/F.

The functional configuration of the robot 1 is classified according to main processing contents in order to facilitate understanding of the configuration of the robot 1. The invention is not limited by a way of classification of components and names of the components. The components of the robot 1 can also be classified into a larger number of components according to processing contents. The components can also be classified such that one component can execute a larger number of kinds of processing. Processing by the components may be executed by one kind of hardware or may be executed by a plurality of kinds of hardware.

Sharing of functions and processing between the control unit 20 and the other components (the arm, the hand, and the like) is not limited to the example shown in the figure. For example, at least a part of the functions of the control unit 20 may be realized by the other components. For example, at least a part of the functions of the other components may be realized by the control unit 20.

Figure 5:
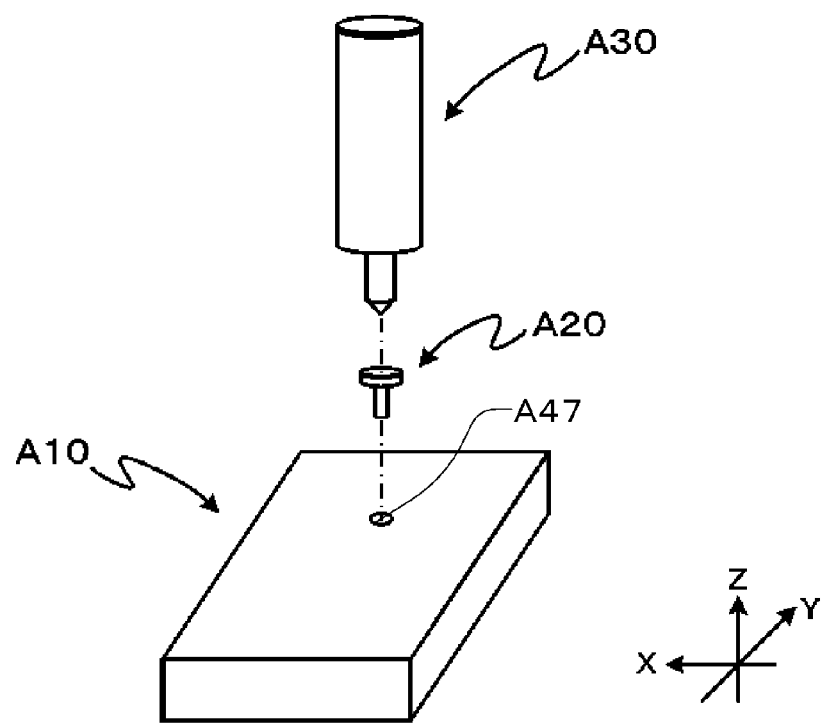
FIG. 5 is a diagram for explaining a first work example performed by the robot.

FIG. 5 is a diagram for explaining a first work example performed by the robot 1. The first work example is a work example for inserting the screw A20 into a screw hole formed in a workpiece A10 and screwing the screw A20. The workpiece A10 has a rectangular parallelepiped shape. For the screwing of the screw A20, for example, the electric driver A30, which a human can also use, is used. The screw A20 is formed of a material including metal such as iron. A driver bit of the electric driver A30 is magnetized. Therefore, the screw A20 can be moved in a state in which the screw A20 is set in the driver bit of the electric driver A30.

An operation from attraction of the screw A20 to the electric driver A30 to screwing of the screw A20 is explained with reference to the drawings.

Figure 6:
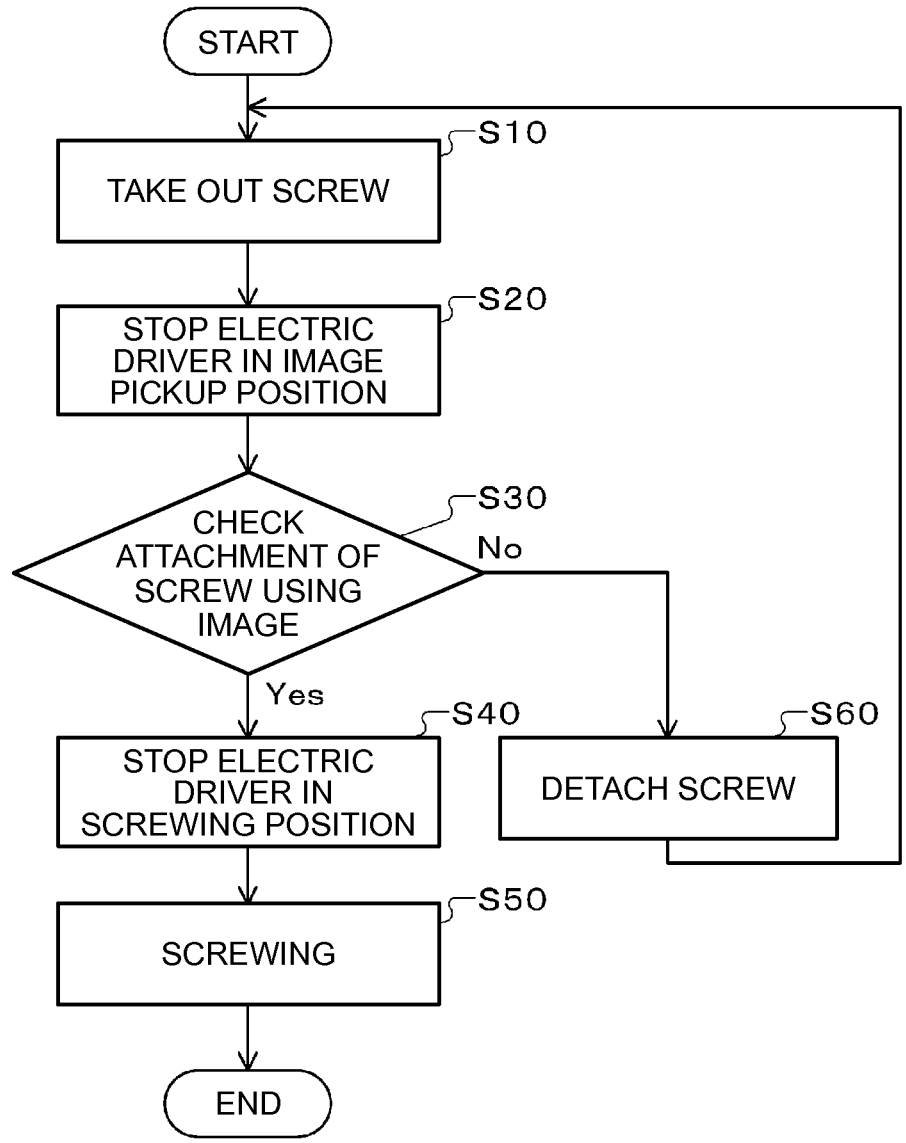
FIG. 6 is a flowchart of an operation from attraction of a screw to the distal end of an electric driver to screwing of the screw.
Figures 7A, 7B:
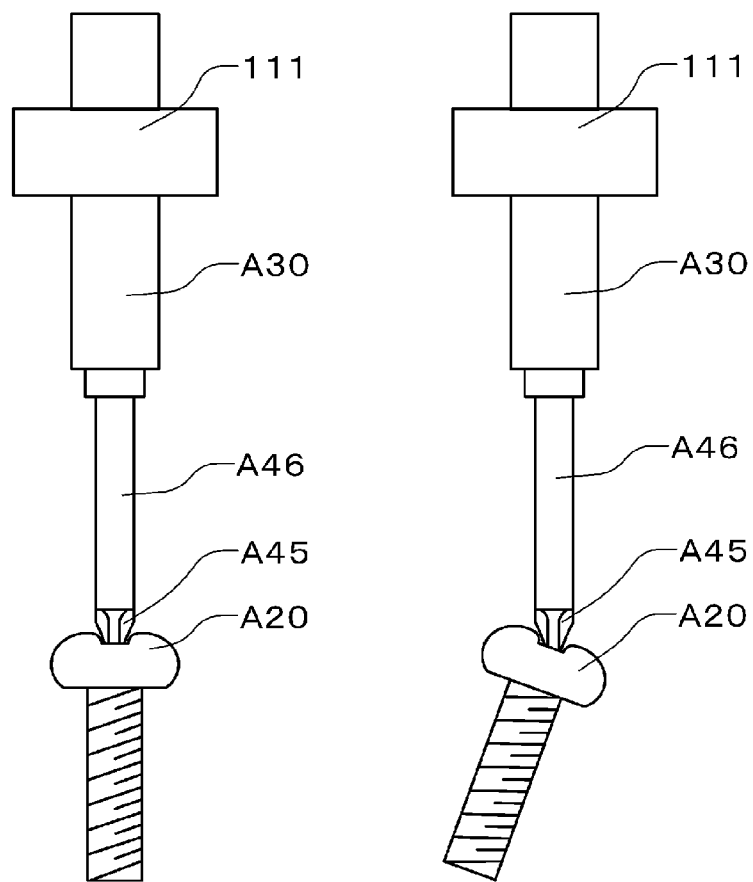

FIG. 6 is a flowchart of an operation from attraction of the screw A20 to the distal end of the electric driver A30 to screwing of the screw A20. FIGS. 7A and 7B are diagrams for explaining an example in which the screw A20 is fit in an engaging section A45 of the electric driver A30.

When the screw A20 is screwed, the screw A20 is attracted to the engaging section A45 of the electric driver A30 using a screw automatic feeder (not shown in the figure). When the screw A20 is attracted, it is inspected using an image whether the screw A20 is correctly attracted to the engaging section A45. Since the engaging section A45 is magnetized, when the screw A20 is not correctly set in the engaging section A45, as shown in FIG. 7B, the screw A20 disadvantageously hangs from the engaging section A45. FIG. 7A shows a state in which the engaging section A45 of the electric driver A30 and the screw A20 are correctly fit.

In the image inspection, it is necessary to correctly recognize the inspection target object (the screw A20). Therefore, it is difficult to recognize the target object in a complicated background where a shape close to the shape of the inspection target object is present. However, the periphery of the robot 1 is a complicated background because people move and various apparatuses are arranged. Therefore, in this embodiment, the image inspection is carried out using the robot 1 as a background to make it possible to perform stable inspection even if the periphery of the robot 1 is a complicated background.

First, in step S10, the control unit 20 controls the arm 11 and pulls out the screw A20 from a rail of a taking-out section of the screw automatic feeder. According to this operation, the screw A20 is pulled out from the rail of the taking-out section of the screw automatic feeder and freed. After step S10 ends, the control unit 20 proceeds to step S20.

Subsequently, in step S20, the control unit 20 stops the electric driver A30 in an image pickup position and picks up images of a bit A46 of the electric driver A30 and the screw A20 attracted to the engaging section A45 using the hand eye camera 11G. After step S20 ends, the control unit 20 proceeds to step S30.

Figure 8B:
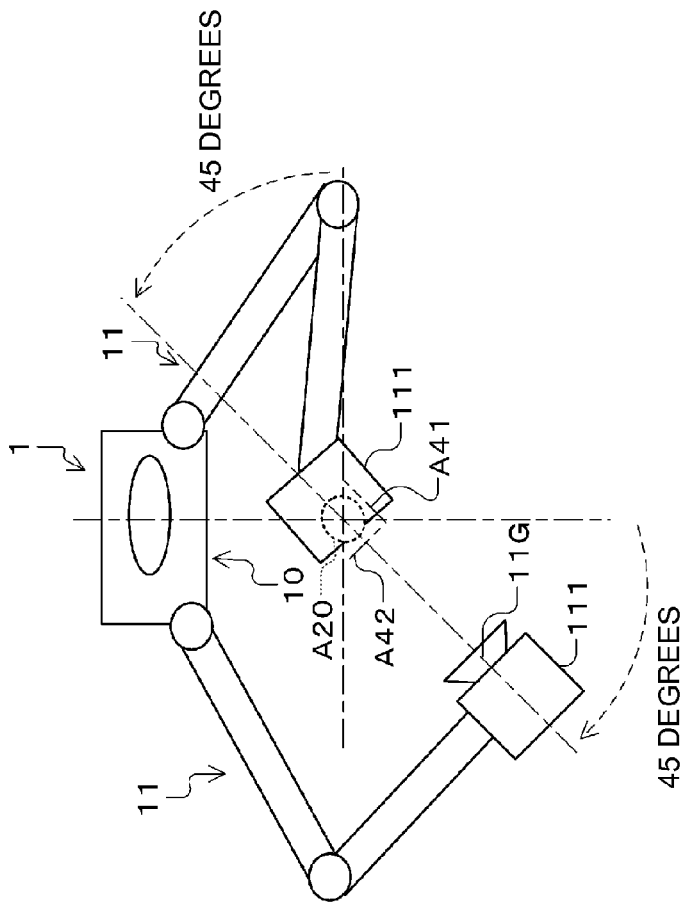
Figure 8A:
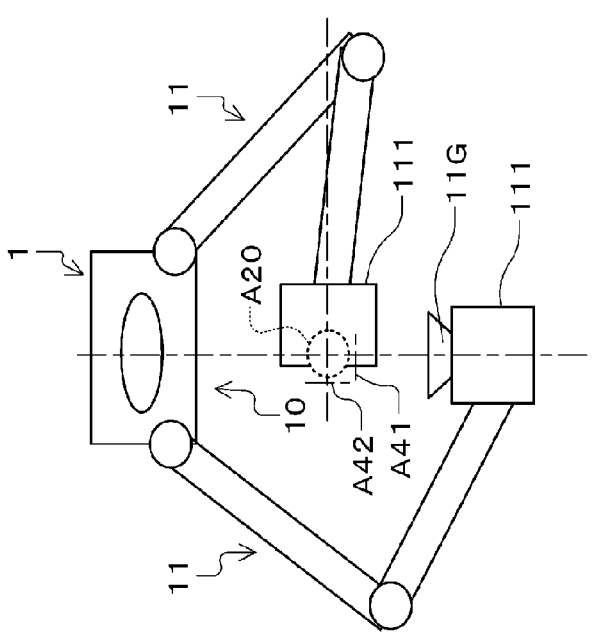
Figure 8C:
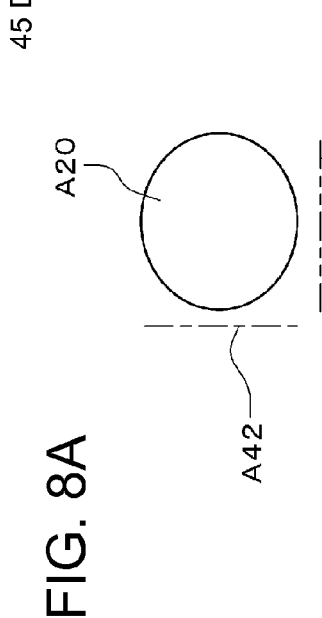

FIGS. 8A to 8C are diagrams for explaining image inspection at two visual points performed by the robot 1. FIG. 8A is a diagram for explaining image inspection at one visual point. FIG. 8B is a diagram for explaining image inspection at the other visual point. FIG. 8C is a diagram showing the two visual points.

In image inspection for the screw A20 to be subjected to image pickup by the hand eye camera 11G using the robot 1 as a background, the control unit 20 performs the image inspection at two visual points (directions) explained below.

For example, the control unit 20 performs the image inspection from two visual points where the screw A20 is shifted by 90 degrees. Specifically, at one visual point, as shown in FIG. 8A, the control unit 20 performs the image inspection of a surface A41 of the screw A20 using the body section 10 of the robot 1 as a background. At the other visual point, as shown in FIG. 8B, the control unit 20 rotates the hand 111 by 45 degrees (counterclockwise on FIGS. 8A and 8B) and moves the hand eye camera 11G by 45 degrees (clockwise on FIGS. 8A and 8B) from the state of the one visual point and performs the image inspection of a surface A42 of the screw A20 using the arm 11 of the robot 1 as a background.

Therefore, as shown in FIG. 8C, the control unit 20 can perform the image inspection from the two visual points (the surface A41 and the surface A42) where the screw A20 is shifted by 90 degrees. Consequently, since the image pickup is performed directly horizontally as well, it is possible to more accurately recognize a shifting direction of the screw A20.

Note that, at the other visual point, it is also possible that the bit A46 (see FIGS. 7A and 7B) is rotated by 45 degrees (counterclockwise on FIGS. 8A and 8B), the hand eye camera 11G is moved by 45 degrees (clockwise on FIGS. 8A and 8B), and the image inspection of the surface A42 of the screw A20 is performed using the arm 11 of the robot 1 as a background. Further, it is also possible that the bit A46 is rotated by 90 degrees (counterclockwise on FIGS. 8A and 8B) and the hand eye camera 11G performs the image inspection using the body section 10 of the robot 1 as a background in the state of the one visual point.

The body section 10 and the arm 11 may have a predetermined color in a plane. For example, a bluish tone called blue back can be applied. Consequently, since the body section 10 and the arm 11 have the predetermined color, it is possible to perform the image processing without using a more complicated algorithm.

The body section 10 and the arm 11 may have a uniform contrast in a plane. Consequently, since the contrast is uniform, it is possible to perform the image processing without using a more complicated algorithm.

Subsequently, in step S30, the camera control unit 22 of the control unit 20 acquires image data output by the hand eye camera 11G and converts the acquired image data into digital data.

The control unit 20 discriminates, from the image data output by the hand eye camera 11G, by performing publicly-known template matching or the like, whether the screw A20 is attracted to the engaging section A45 of the electric driver A30 in a correct posture. When the screw A20 is attracted in the correct posture (Yes in step S30), the control unit 20 proceeds to step S40. When the screw A20 is not attracted in the correct posture (No in step S30), the control unit 20 proceeds to step S60.

For example, a designer of the robot 1 or a designer of control information of the robot 1 stores in advance, in a storing unit, as template image data, image data obtained by correctly attracting the screw A20 to the engaging section A45 of the electric driver A30 and picking up an image of the screw A20 in advance. The control unit 20 calculates, according to a template matching method, similarity of the stored template image data and the image data output by the hand eye camera 11G. The control unit 20 discriminates, according to the magnitude of a value of the calculated similarity, whether the screw A20 is fit in the engaging section A45 of the electric driver A30 in a correct posture.

The control unit 20 experimentally calculates in advance similarity at the time when a shift amount between the engaging section A45 of the electric driver A30 and the screw A20 is a shift of a degree allowed in screwing and sets a value of the similarity as a threshold. When the calculated similarity is equal to or higher than the threshold set in advance, the control unit 20 discriminates that the screw A20 is fit in the engaging section A45 in the correct posture. When the calculated similarity is smaller than the threshold, the control unit 20 discriminates that the screw A20 is not fit in the engaging section A45 in the correct posture.

As explained above, when the screw A20 fit in the engaging section A45 of the electric driver A30 is subjected to image pickup by the hand eye camera 11G, The image inspection is carried out using the robot 1 as a background. Therefore, it is possible to perform stable inspection even if the periphery of the robot 1 is a complicated background.

Subsequently, in step S40, the control unit 20 advances the electric driver A30 to a screwing position and stops the electric driver A30. After step S40 ends, the control unit 20 proceeds to step S50.

Subsequently, in step S50, the control unit 20 moves the electric driver A30 gripped by the arm 11 and presses the screw A20 against a screw hole A47 (see FIG. 5) of a target object to be screwed. By pressing the screw A20, torque for rotating the engaging section A45 of the electric driver A30 is generated. Therefore, the control unit 20 presses the screw A20 fit in the engaging section A45 of the electric driver A30 against the screw hole A47 to perform screwing of the screw A20.

Subsequently, in step S60, when the screw A20 is not correctly fit in the engaging section A45 of the electric driver A30 in step S30, the control unit 20 detaches the screw A20 by bringing the attracted screw A20 close to an object that generates magnetism larger than the magnetism of the engaging section A45 of the electric driver A30. After detaching the screw A20, the control unit 20 returns to step S10.

A method of detaching the screw A20 is not limited to the method explained above. The control unit 20 may detach the screw A20 by, for example, suddenly accelerating or suddenly decelerating the distal end of the arm 11 and increasing an inertial force acting on the screw A20 to be larger than a frictional force acting between the screw A20 and the electric driver A30. Alternatively, the control unit 20 may detach the screw A20 by magnetizing the engaging section A45 of the electric driver A30 in steps S10 to S50 and demagnetizing the engaging section A45 of the electric driver A30 in step S60.

In this embodiment, since the predetermined body section 10 is used as a background for image pickup of the hand 111, it is possible to perform the image processing without using a complicated algorithm. Consequently, the image processing is accurately and quickly performed. As a result, in the image inspection, it is possible to realize versatile and stable inspection by using a housing of a robot as a background.

Note that, in the embodiment, the image pickup unit is not limited to the hand eye camera 11G. For example, the image pickup unit may be provided on the outside of the robot 1.

The embodiment of the invention is explained above. However, the technical scope of the invention is not limited to the scope described in the embodiment. It is evident for those skilled in the art that various changes and improvements can be added to the embodiment. It is evident from the description of the appended claims that forms added with such changes and improvements could also be included in the technical scope of the invention. The invention may be provided as a robot system separately including a robot and a robot control apparatus (a control unit) or may be provided as the robot and the robot control apparatus of the robot system. The invention can also be provided as a method of controlling the robot and the like, a computer program for controlling the robot and the like, and a storage medium having the computer program stored therein.

The entire disclosure of Japanese Patent Application No. 2013-229064, filed Nov. 5, 2013 is expressly incorporated by reference herein.

What is claimed is:
1. A robot comprising:
  a robot main body including a trunk and a base, the trunk being continuously provided with the base;
  a plurality of manipulator members that are coupled to each other to form an arm, the arm being connected to the robot main body;
  a holding unit that is connected to one of the plurality of manipulator members and that is adapted to hold an object; and
  an image pickup unit that takes images,
  wherein the image pickup unit takes the images of the holding unit and the object, and chooses the trunk as a first background image.
2. The robot according to claim 1,
  wherein the trunk has a predetermined color.

3. The robot according to claim 1,
wherein the trunk has a uniform contrast.

4. The robot according to claim 1, further comprising:
a first rotating mechanism that rotates the holding unit in a first rotation direction; and
a second rotating mechanism that rotates the image pickup unit in a second rotation direction opposite to the first rotation direction,
wherein the images include first and second images,
the image pickup unit takes the first image choosing the trunk as the first background image when the holding unit, which holds the object, is in a first position and when the image pickup unit is in a second position, and
the image pickup unit takes the second image choosing a part of the plurality of manipulator members as a second background image when the holding unit, which holds the object, is in a third position and when the image pickup unit is in a fourth position.

5. The robot according to claim 4,
wherein the first position and the third position are offset from one another by 45 degrees by rotating the holding unit by the first rotating mechanism in the first rotation direction, and the second position and the fourth position are offset from one another by 45 degrees by rotating the image pickup unit by the second rotating mechanism in the second rotation direction.

6. The robot according to claim 4, wherein the part of the plurality of manipulator members has a predetermined color.

7. The robot according to claim 4, wherein the part of the plurality of manipulator members has a uniform contrast.

8. The robot according to claim 1, wherein
the holding unit is a screw driver, and
the object is a screw attracted to the screw driver.

9. The robot according to claim 1, further comprising:
a robot control apparatus, wherein
the robot control apparatus includes a controller that is configured to control the plurality of manipulator members, the holding unit, and the image pickup unit.

10. The robot according to claim 2, further comprising:
a robot control apparatus, wherein
the robot control apparatus includes a controller that is configured to control the plurality of manipulator members, the holding unit, and the image pickup unit.

11. The robot according to claim 3, further comprising:
a robot control apparatus, wherein
the robot control apparatus includes a controller that is configured to control the plurality of manipulator members, the holding unit, and the image pickup unit.

12. The robot according to claim 4, further comprising:
a robot control apparatus, wherein
the robot control apparatus includes a controller that is configured to control the plurality of manipulator members, the holding unit, the image pickup unit, and the first and second rotating mechanisms.

13. The robot according to claim 5, further comprising:
a robot control apparatus, wherein
the robot control apparatus includes a controller that is configured to control the plurality of manipulator members, the holding unit, the image pickup unit, and the first and second rotating mechanisms.

14. The robot according to claim 6, further comprising:
a robot control apparatus, wherein
the robot control apparatus includes a controller that is configured to control the plurality of manipulator members, the holding unit, the image pickup unit, and the first and second rotating mechanisms.

15. The robot according to claim 7, further comprising:
a robot control apparatus, wherein
the robot control apparatus includes a controller that is configured to control the plurality of manipulator members, the holding unit, the image pickup unit, and the first and second rotating mechanisms.

16. A robot control apparatus comprising:
a robot body;
an arm that is connected to the robot body;
an object holder that is connected to the arm and that is adapted to hold an object;
a first rotating mechanism that rotates the object holder in a first rotation direction;
a camera that takes first and second single images, each of the first and second single images including the object holder and the object;
a second rotating mechanism that rotates the camera in a second rotation direction opposite to the first rotation direction; and
a controller that is configured to control the arm, the object holder, the camera, and the first and second rotating mechanisms,
wherein the camera takes the first single image choosing a part of the robot body as a first background image when the object holder, which holds the object, is in a first position and when the camera is in a second position,
the camera takes the second single image choosing a part of the arm as a second background image when the object holder, which holds the object, is in a third position and when the camera is in a fourth position, and
the first position and the third position are offset from one another by 45 degrees by rotating the object holder by the first rotating mechanism in the first rotation direction, and the second position and the fourth position are offset from one another by 45 degrees by rotating the camera by the second rotating mechanism in the second rotation direction.

* * * * *